United States Patent [19]
Gilbu

[11] 3,886,016
[45] May 27, 1975

[54] METHOD AND APPARATUS FOR MAKING A REINFORCED WALL

[75] Inventor: Agnar Gilbu, Conroe, Tex.

[73] Assignee: Owens-Corning Fiberglas Corporation, Toledo, Ohio

[22] Filed: Dec. 29, 1972

[21] Appl. No.: 316,593

[52] U.S. Cl. ............... 156/171; 156/172; 156/188; 156/433; 156/457; 156/494
[51] Int. Cl. ............................................ B65h 81/00
[58] Field of Search ........... 156/171, 172, 187, 188, 156/446, 425, 429, 431, 432, 447, 457, 494

[56] References Cited
UNITED STATES PATENTS

| | | | |
|---|---|---|---|
| 3,412,891 | 11/1968 | Bastone et al. | 156/171 |
| 3,464,879 | 9/1969 | Poulsen | 156/425 |
| 3,492,187 | 1/1970 | Hirtzer | 156/446 |
| 3,499,815 | 3/1970 | Hof | 156/446 |
| 3,700,512 | 10/1972 | Pearson et al. | 156/172 |
| 3,796,620 | 3/1974 | Dunn | 156/171 |

*Primary Examiner*—Daniel J. Fritsch
*Attorney, Agent, or Firm*—Carl G. Staelin; John W. Overman; Hiram P. Settle, Jr.

[57] ABSTRACT

A method and apparatus for making a rib construction for reinforcing fluid retaining walls, particularly walls formed of reinforced synthetic resin. The method involves the application to the wall of a prefabricated rib form of convex cross-section radially encircling the wall, winding a plurality of layers of resin-impregnated fibrous reinforcement mat on the rib form and the concurrent winding of spaced bundles of resin-impregnated radial filament wound roving wound onto the rib form, the filament windings being placed at the crown and the feet of the mat-covered rib form. The windings are separated or spaced during the rib build-up to cover and reinforce specific portions of the rib.

The apparatus for making such ribs is also disclosed, whereby the rib form and the mat layers are placed and secured on the wall. The apparatus facilitates the insertion of the rib form and mat layers at the nip defined by the tensioned filament wound roving extending tangentially of the wall as is rotated past a non-rotatable work station. The method and apparatus are specifically disclosed for forming radial ribs on a rotatable, axially movable endless wall formed on a band-type mandrel, the work station moving axially with the wall.

10 Claims, 9 Drawing Figures

METHOD AND APPARATUS FOR MAKING A REINFORCED WALL

RELATED APPLICATION

This application is related to application Ser. No. 223,164, filed Feb. 3, 1972, now U.S. Pat. No. 3,796,620, and assigned to the assignee of this application. The earlier application discloses and claims an earlier version of the method and apparatus of this application.

BACKGROUND AND BRIEF DESCRIPTION OF THE INVENTION

The desirability of utilizing non-metallic underground storage tanks, drainage conduits, and the like has long been recognized. The desirability of utilizing reinforced synthetic resins, such as polyester resins or the like reinforced with glass fibers, has been proposed to avoid the corrosion which inevitably occurs in steel tanks and the like metallic receptacles.

Such reinforced synthetic resin tanks have been developed and on sale for some time, but problems still exist in the design of such tanks to withstand the appreciable compression forces engendered by the underground location of the tanks. The utilization of exterior peripheral stiffening ribs integrated into or superimposed upon the tank or pipe wall structure has been suggested. Typical of such wall structures is that disclosed in the Pearson, et al U.S. Pat. No. 3,661,294, dated May 9, 1972 and assigned to the assignee of the present invention.

The rib disclosed in this patent is a multi-layered construction which is extensively filament wound as the rib is built up on the wall with the wall being rotated on a central supporting mandrel. While the rib disclosed in this patent functions quite well in underground installations, the length of time necessary to build up the wall structure and the extensive utilization of angularly disposed filament wound roving makes the utilization of such a rib impractical under certain circumstances.

One such circumstance arises where the tank or pipe wall is made continuously upon a band-type mandrel such as that disclosed in the patents to Poulsen Nos. 3,464,879; 3,655,489; and 3,679,521. In this type of apparatus, the cylindrical tank or pipe wall is built up by the application of chopped glass fibers or the like and synthetic resin to a mandrel surface which comprises a narrow spirally wrapped, continuously advancing band of steel, the band edges abutting one another to form a smooth cylindrical surface.

Since the tank or pipe wall is formed continuously and is displaced axially as well as rotationally during the wall formation, there is a limited time within which the peripheral rib structure can be formed. Further, it has been found that an improved rib structure of the present invention is provided by utilizing radial or "zero degree" filament winding as contrasted with the angular windings of the Pearson. et al patent.

Further improvement is obtained by specifically placing such radial windings at varying, yet specifically located, positions on the rib, i.e., at the "crown" and the "feet" of the convex rib structure.

The apparatus herein disclosed utilized a specific tray providing the rib components, e.g., prefabricated rib form, woven mat and filament windings, at a work station which is non-rotatable but axially displaceable with the primary wall carried on the mandrel band. The tray carries movable guide means for the filament windings, the guide means serving (1) to separate the windings into separate groups applied to separate portions of the rib and (2) to move the windings relative to one another as the rib formation proceeds to specifically distribute the windings over the rib.

The method of this invention includes the rib-fabrication procedure, including the step of relatively moving the windings to distribute the windings over the rib.

It is therefore, an important object of this invention to provide a novel method and apparatus for making a radial reinforcing rib on a helically moving wall surface.

Another important object is the provision of an apparatus wherein a work-station is displaced longitudinally — but not rotationally — in synchronism with a helically movable wall surface to facilitate the building up of a radial rib on the surface.

Still another, and no less important, object is to provide a method of applying radial filament windings to a radial, pre-fabricated rib structure on a helically moving surface, the windings being variably spaced from one another to reinforce different portions of the rib.

DETAILED DESCRIPTION OF THE INVENTION

Figure 1:
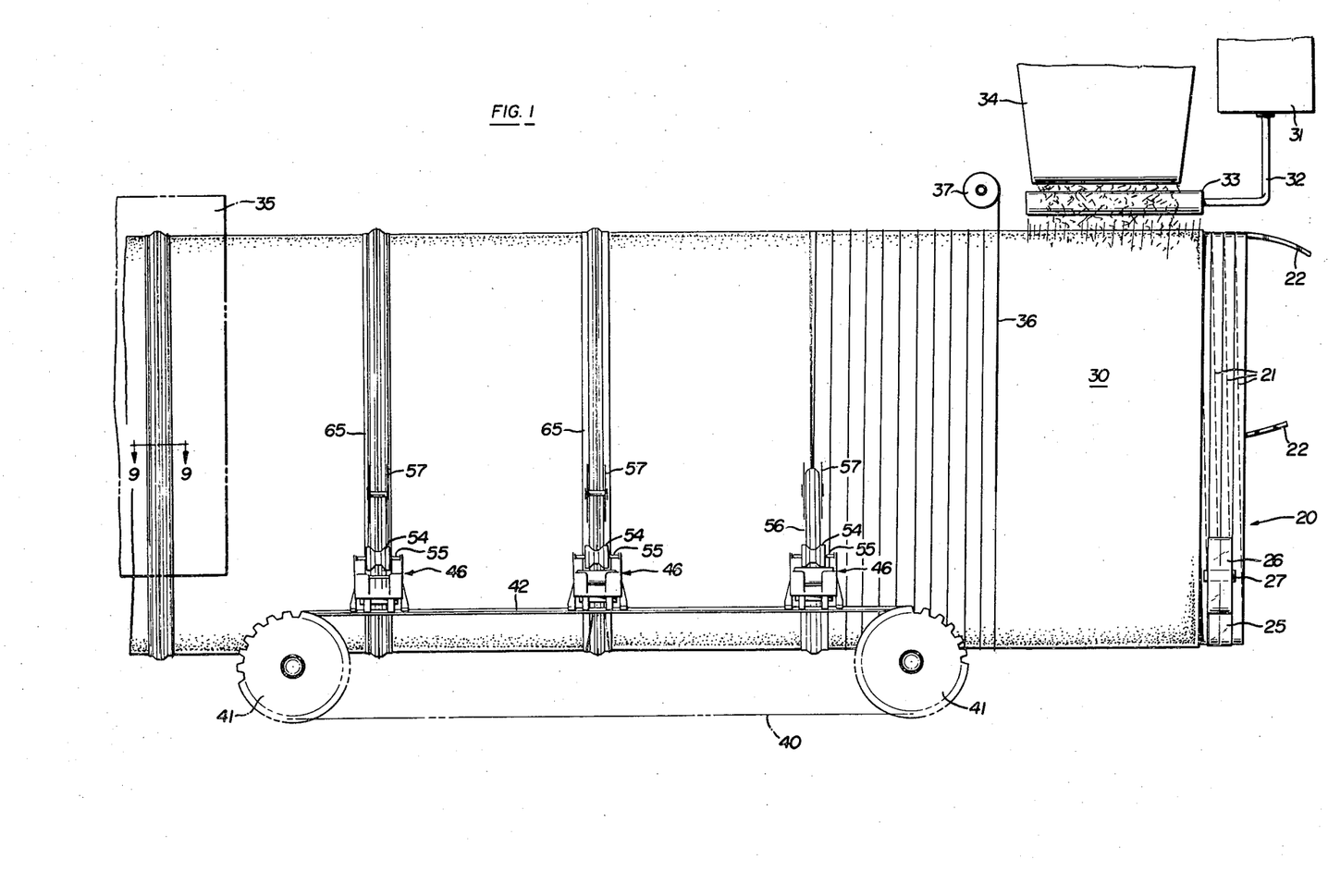
FIG. 1 is a side elevation view schematically representing an apparatus of the present invention capable of carrying out the method of the present invention.

As shown on the drawings, in FIG. 1, reference number 20 refers generally to a cantilevered support structure or mandrel of the "continuous ribbon" type, such as that disclosed in the U.S. Pat. No. to Poulsen Nos. 3,464,879, 3,655,489 and 3,679,521. The Poulsen patents disclose a pipe or tube making apparatus wherein a cylindrical mandrel is defined by a continuously traveling steel band 21 supported upon an internal structure so that the bands 21 move continuously in a helical pattern, the edges of successive laps of the bands abutting one another to define a continuous, cylindrical, helically traveling exterior mandrel surface.

As shown in FIG. 1, the bands 21 travel downwardly and to the left. When the band 21 reaches the end of the support surface, the band is returned axially of the cylindrical mandrel 20, the return portion of the band being indicated by reference numeral 22, and this band return portion is simple fed radially outwardly onto the support structure to re-constitute successive portions of the peripheral surface. All of the support surface, the method of feeding the band, and the manner in which the return portions 22 of the band 21 are placed and positioned to re-constitute the movable surface are fully disclosed in the above-referenced Poulsen patents.

As the band 21 advances, it is covered by a parting layer 25, preferably formed of "Mylar" or similar relatively inert plastic sheeting in the form of a band which is wider than one of the mandrel bands 21. The band 25 is applied from a supply roll 26 mounted on a mandrel on a support shaft 27 which is simply positioned adjacent the periphery of the mandrel 20. This parting sheet is self-overlapping and provides a liquid tight cover for the mandrel, as well as providing a parting sheet for the subsequent separation from the mandrel surface of the article built up on the mandrel.

The continuously formed cylindrical wall 30 is built up on the mandrel 20 from a combination of chopped glass fibers and resin. The wall structure 30 is generally similar to that disclosed in issued patent to Bastone, et al, U.S. Pat. No. 3,412,891. The structure in essence, is simply chopped glass fibers disposed in a polyester resin matrix, although epoxy resins or acrylic resins can be utilized, if desired.

The resin is supplied from an overhead source, such as tank 31 and pipe 32, to a sprinkler pipe 33 generally overlying the mandrel 20 and extending parallel to the rotational axis of the mandrel. The pipe 33 has a series of opertures in the undersurface thereof, and the resin flows downwardly onto the surface of the parting film 25 which has been previously applied thereto.

An overhead glass copper 34 is generally coextensive with the resin supply pipe 33, the chooper being displaced angularly from the resin pipe 33 so that the two are not directly superimposed as shown in FIG. 1. The glass chopper 34 delivers randomly oriented, chopped glass fibers of appropriate length onto the surface of the resin which has already been applied to the parting film 25.

It will be appreciated that the concurrent supply of resin and glass to the surface of the mandrel 20 as the mandrel surface advances successively therebeneath will result in the build-up of successive layers of resin and glass, the resin impregnating the glass and imbedding the glass in a resin matrix. The resin-glass proportions can be readily varied and, if desired, inner and outer resin-rich layers can also be built up by applying resin to the surface 25 before and after the supply of glass thereto. Generally, the resin and glass mixture is "rolled out" to insure complete wetting of the glass with the resin, as is well known in the art.

The resin, as applied, includes an accelerator or hardener and the resin air-cures quickly to a self-supporting "gel" state. Final curing of the resin is accomplished in an oven indicated generally at 35 which peripherally encloses, at least partially, the mandrel 20.

After the wall 30 has been built up, to aid in retaining the chopped glass fiber on the surface, and also to provide a reference point along the length of the surface 30, a nylon "string" or reference strand 36 is applied to the surface 30. This reference strand 36 is adhered to the surface of the wall 30 and spirally wraps thereabout at the helical angle of the band 21.

Since the band 21 is advancing in a helical pattern, the wall 30 superimposed thereon also advances helically, the rate of advancement of the wall 30 being the same as the rate of advancement of the bands 21. To apply a peripheral rib to the helically advancing wall 30, it is necessary to compensate for the rate of axial advancement of the wall as the wall advances spirally along the mandrel. The compensate for this rate of advancement, a driving chain arangement is utilized, the chain being indicated generally by reference numeral 40, and the chain being supported by a pair of sprockets 41 axially spaced along the mandrel 21 and along the length of the wall 30 to provide an upper horizontal chain reach 42 which advances to the left in timed, synchronized relationship to the rate of axial advancement of the wall 30 in the same direction. The chain is illustrated diagrammatically in FIGS. 1 and 2 and the means for driving the chain through the sprockets 41 is not shown. Those skilled in the art certainly can appreciate the driving and synchronization means which are commercially available and necessary to drive this chain.

Figure 2:
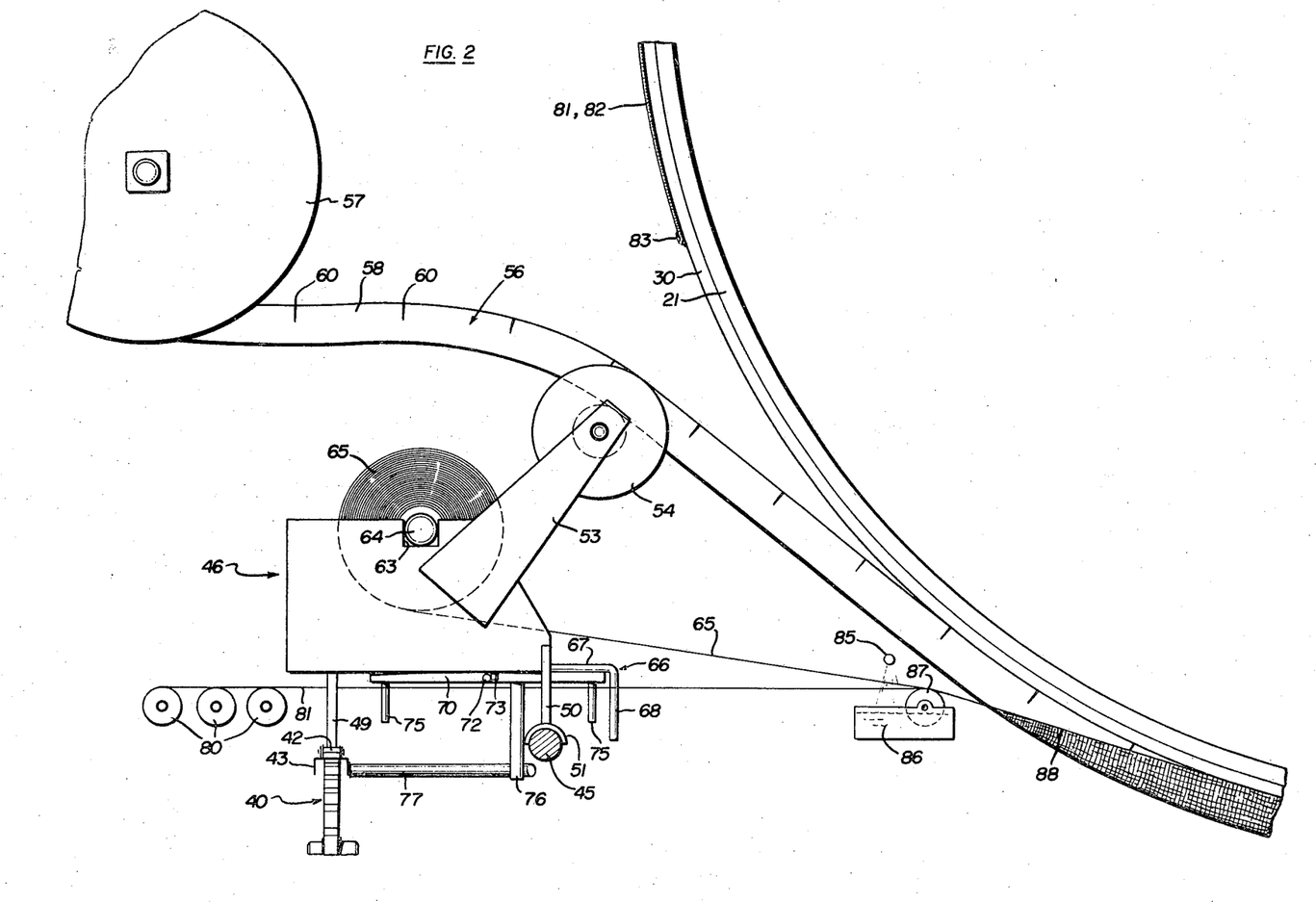
FIG. 2 is an enlarged fragmentary, somewhat schematic sectional view further illustrating the apparatus and method of the present invention.

The upper reach 42 of the chain is supported against vertical deflection by means of a lower support channel 43 (FIG. 2). A front support rod 45 extends parallel to the reach 42 of the chain and is coextensive therewith.

A supply tray 46 is superimposed on the chain reach 42 and the support rod 45 for movement with the chain in a plane parallel to the axis about which the wall 30 is helically advancing. The supply tray provides a work station which is non-rotatable relative to the wall and which is advanceable axially with the wall by means of the chain. More specifically, the tray 46 comprises a bottom wall 47 and upwardly extending spaced side walls 48. The bottom wall carries a depending leg 49 engageable with the chain reach 42, and the side walls carry spaced depending legs 50 having semi-circular bearing feet 51 at their lower ends engageable with the rod 45. As the chain reach 42 advances in the direction of advancement of the wall 30, the tray 46 is advanced by the engagement of its leg 49 with the chain reach 42, the sliding engagement between the bearing feet 51 and the rod 45 insuring that the tray is stabilized and guided for such movement.

The tray 46 is provided with a pair of upwardly projecting arms 53 extending toward the wall 30 supported on the bands 21, these arms carrying therebetween a guide roller 54 (FIGS. 1 and 2). The guide roller 54 is provided with integral shafts 55 journalled in the arms 53, the roller being of concave central configuration to match the configuration of a rib form 56 which is fed from a supply roll 57 over the roller 54 onto the surface 30, as will be hereafter explained.

The rib form 56 is of isoceles trapezoidal crosssectional configuration, and consists of a cardboard exterior cover 58 draped over and stapled or otherwise secured to interior form blocks 59. The form blocks 59 are of trapezoidal configuration and are spaced along the length of the rib form 56. The cardboard cover 58 is kerfed or split as indicated at 60, so that the rib form can conform to the cylindrical periphery of the wall 30. The rib form 56, including the cover 58 and the blocks 59, are prefabricated and utilized as explained in the above referenced Bastone, et al. U.S. Pat. No. 3,412,891. The blocks 59 may be formed of wood, plastic, or the like, and plastic blocks, if utilized, may be vacuum formed, injection molded or otherwise shaped to the desired trapezoidal configuration. A sufficient length of the rib form 56 is carried by the supply roll 57 to provide a single complete annular rib upon the exterior of the wall 30. The rib form 56 is oriented during application so that the wider base of the trapezoidal form contacts the exterior of the previously built-up wall 30, the narrower crown of the form being spaced from the wall 30. Obviously, the rib form may be provided in other convex configurations than the specifically illustrated trapezoidal shape, and the rib form may also be fabricated of other form-defining materials, e.g. plastic form, a self-sustaining plastic form, etc.

Figure 9:
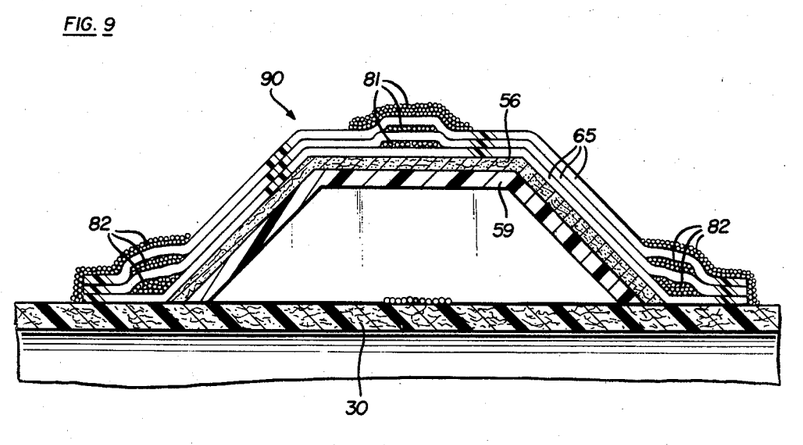
FIG. 9 is a sectional view taken along the plane 9—9 of FIG. 1 and illustrating the finished rib of the present invention.

The side walls 48 of the tray 46 are notched, as at 63, to receive therein a shaft 64 bearing a roll of 65 of a mat utilized in building up the rib of the present invention. This mat 65 is preferably a woven fiberglass mat or web of sufficient width to completely cover the exterior trapezoidal surface of the rib form 56 and to extend somewhat there beyond, as illustrated in FIG. 9. Preferably, the mat is that commercially available under the trade name FAB-MAT and consists of a layer of woven fiberglass filaments forming a cloth-like mat to which loose, chopped, randomly oriented fiberglass filaments are adhered at one surface. This material is preferred because of its inherent transverse and longitudinal strength due to its woven construction, reinforced by the randomly oriented chopped fiber which forms a porous mass which can be readily resin impregnated for incorporation into the final rib structure. The roll 65 of FAB-MAT is of a length from two to three times greater than the length of the rib form 56, so that from two to three layers of the FAB-MAT will encompass the rib form in the final rib configuration. Additionally, the roll 65 is formed so that the chopped glass fibers of the mat are on the interior of the roll and on the interior of the mat as it is laid over the rib form.

The tray includes a fixed depending, central roving guide indicated generally at 66, this guide 66 including a pair of laterally spaced rods 67 projecting forwardly from the bottom wall of 47 of the tray, the free ends 68 of the rods being deflected downwardly and laterally spaced to be joined by a brace 69. The guide 66 is thus capable of confining strands of roving therebetween generally beneath the tray and at a location centrally of the tray.

Figures 3, 4, 5, 6, 7, 8:
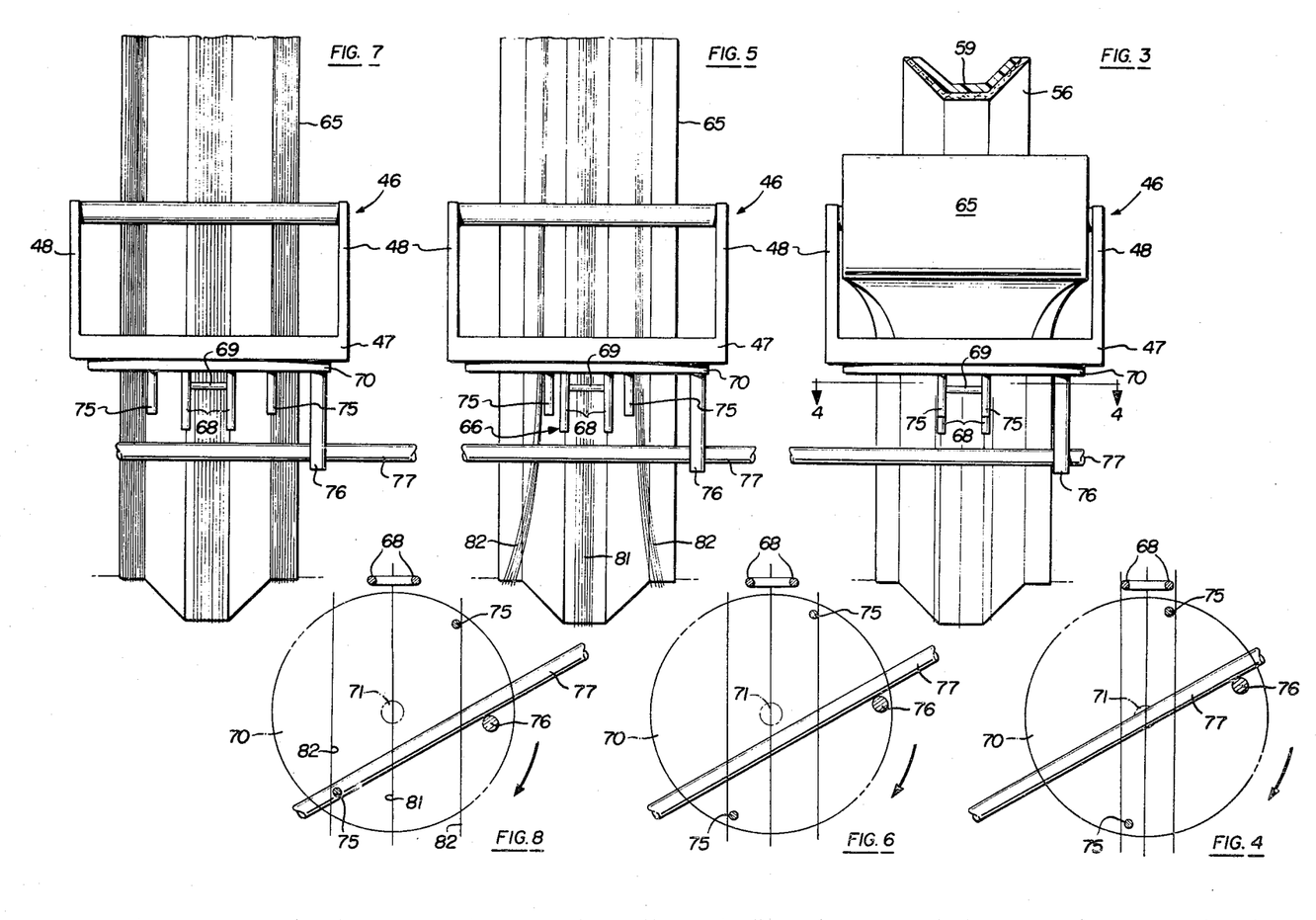
FIG. 3 is a greatly enlarged schematic sectional view, with parts eliminated for clarity, illustrating an initial step in the method of the present invention.
FIG. 4 is a schematic sectional view taken along the plane 4—4 of FIG. 3.
FIG. 5 is a view similar to FIG. 3 illustrating a next step in the method of the present invention.
FIG. 6 is a view similar to FIG. 4 and taken along the plane 6—6 of FIG. 5.
FIG. 7 is a view similar to FIGS. 3 and 5 and illustrating the final step in carrying out the method of the present invention.
FIG. 8 is a view similar to FIGS. 4 and 6 and taken along the plane 8—8 of FIG. 7.

Carried by the tray bottom wall 47 is a pivot plate 70 arcuately movable about a central bearing, schematically illustrated at 71 in FIGS. 4, 6 and 8. The tray plate 70 carries an indicator projection or stud 72 projecting radially therefrom which contacts a stud 73 fixed to the bottom wall 47 of the tray 46. When the studs 72 and 73 are placed in contact, the plate 70 is pivotally indexed to a pre-determined initial starting position.

The rotatable plate 70 also carries a pair of depending strand guides 75 which are fixed to the plate for pivotal movement therewith.

The strand guides 75 are affixed to the plate 70 at locations which are 180 degrees apart, as will be seen from inspection of FIGS. 4, 6 and 8. Also carried by the plate is a depending follower pin 76 which is longer than the strand guides 68, 75, and which is fixed to the plate adjacent to the exterior periphery thereof, also as shown in FIGS. 4, 6 and 8.

Underlying the chain reach 42 in fixed relation thereto is a diagonally extending cam bar 77 interposed in the path of movement of the follower pin 76. As the trays 46 are carried by the chain reach 42 axially along the length of the mandrel 20, the depending follower pin 76 contacts the cam bar 77. Relative translatory motion of the tray with respect to the bar 77, while the pin 76 contacts the bar 77, causes the pin 76 to be displaced in a clockwise direction, thereby pivoting the plate 70 around its center bearing 71. The extent of this pivoting motion can be readily observed by a comparison of FIGS. 4, 6 and 8. As the plate 70 is pivoted around the center 71, the pins 75 carried by the rotatable plate are moved laterally relative to the fixed strand guide 66.

Turning now to FIG. 2 of the drawings, it will be seen that a plurality of supply spools of glass fiber filament roving 80 are provided. Roving from these spools 80 is divided into three portions or "hands." One such hand 81 is passed through the center roving guide 66, a second hand 82 is placed outside one movable roving guide 75, while the third hand 82 is placed outside the other roving guide 75. The roving then passes onto the wall 30 of chopped fiber strands and resin matrix on the surface of the mandrel band 21, the three hands of roving being tied to the reference strand 36, as at 83. The three hands of roving are thus peripherally lapped about the wall 30, the three roving hands being tightly bunched as illustrated in FIG. 4 of the drawings.

Prior to being placed upon the wall 30, the rovings are impregnated or wetted with resin from an overhead sprinkler pipe 85 from which resin issues downwardly through the strands and into a catch pan 86. A wetting roller 87 carried by the pan 86 further insures that the roving is completely wet and impregnated with resin prior to its being placed on the wall 30. As the wall 30 passes beneath the roving 81, 82, with the roving 81, 82 being under tension, the roving contact the wall 30 initially at a "nip" located at 88.

After about one complete revolution of the roving 81, 82 has been placed on the surface 30, thereby fixing the roving to the wall, the operator grasps the rib form 56 from the supply roll 57, passes the rib form over the roller 54, and inserts the rib form into the nip 88. At about the same time, the operator grasps the free end of the mat 65 and places that into the nip 88. The nip action between the surface 30 and the roving 81, 82 holds the rib form 56 and the mat 65 on the surface 30 under the tension of the roving 81, 82. It will be noted that the mat 65 is interposed between the pipe 85 and the pan 86, and that the mat 65 also passes over the roller 87. In this way, the mat also is wet with the resin from the pipe 85 and the roller 87. If desired, a prefabricated subassembly of the rib form 56 and the mat 65 may be fed to the nip 88. In essence, the rib form 56 and the mat 65 are pre-fabricated and pre-assembled when entering the nip 88 in the manner illustrated in FIG. 2.

Turning now to FIGS. 3 and 4, it will be seen that the strands of the center hand of roving 81 are located by the fixed guide 66 to be superimposed upon the crown of the rib form 56 while the strands of roving 82 are located to either side of the crown of the rib form 56. Actually, the strands of roving 81, 82 contact the mat 65 which is directly superimposed on the rib form 56. Since the strands of the roving 82 are displaced somewhat outboard of the crown of the rib form 56, the tension in the strands 82 will cause the strands to slide downwardly and outwardly over the inclined sides of the trapezoidal rib form. the outer strands 82 come to rest upon that portion of the mat 65 located at the foot of each of the inclined rib form side walls.

The sliding of the filament wound rovings down the inclined sides of the trapezoidal rib form accomplishes several objects. First, the tensioned roving filaments guide and hold the rib form and the mat onto the surface of the wall 30; secondly, the tension in the roving filaments tends to compact and de-aerate the mat covering the rib form; thirdly, the tensioned filament would roving comes to rest at the foot of the rib form walls in a location which directly reinforces the juncture of the rib and the wall 30; additionally, the roving tension smooths and covers any wrinkles or irregularities of the mat at the outer edges thereof. At the same time, the location of the filament wound rovings 81 at the crown of the rib circles the rib at its outermost extremity with hoop windings of filaments located at the largest diameter of the rib as the rib is being built up.

As above explained, the length of the rib preform 56 is equivalent to the diameter of the wall 30, so that the rib form is laid up in a single thickness. However, the mat is cut a length which is equal to two or three times the external diameter of the rib form, so that a plurality of layers of mat are successively built up on the rib form, as the rib form is advanced helically with the wall 30.

Of course, as the winding of the rib form 56 and the mat 65 takes place under the tension of the roving strands 81, 82 the pan 46 is being displaced longitudinally by the upper reach 42 of the chain. The follower pin 76 engages the surface of the cam rod 77 as illustrated in FIGS. 4, 6 and 8, as the pan and the chain are longitudinally displaced, thereby rotating the pan plate 70. Rotation of the plate progressively laterally spreads the strand guide pins 75 and the strands 82 engaged thereby, and the strands 82 are progressively spread relative to the rib form 56. The spreading of the strands 82 places the strands progressively outwardly of the successive mat layers overlying the rib form 56. By the time the pan 46 attains the position of FIGS. 7, 8, the strainds 82 are placed directly at the ribwall juncture; and further application of the strands 82 to the structure builds up the filament winding thickness at exactly the point of greatest stress concentration, i.e., on either side of the rib-wall juncture.

All of the fabrication of the complete rib form 90 (FIG. 9) takes place very quickly. The first revolution of the wall 30 past the work station defined by the pan 46 secures the roving to the wall, the second revolution completely applies the rib form 56, the second revolution through the fourth revolution applies the multiple layers of the mat 65, while the filament windings are applied continuously. To strength the rib, the application of the filament windings continues for another several rotations..e.g., on the order of 8–15 additional rotations. The total rib thus is formed within 12 to 20 revolutions. Since the band 21 of the mandrel is 3 inches wide, it can be seen that a complete rib can be fabricated within an axial extent of the mandrel of from 4 to 7 feet.

Also, as illustrated in FIG. 1, several ribs are fabricated at the same time. As a result of this fabrication technique it becomes entirely feasible and commercially possible to fabricate ribs on the surface of a continuously moving wall between the point of primary wall fabrication and the point of thermal curing.

Finally, the composite wall 30 — rib 90 is cured, preferably in the oven 35 (FIG. 1). The resin matrix of the wall 30 and the resin matrix impregnating the rib mat layers and the filament wound rovings 81, 82 are jointly commonly cured to a monolithic structure.

To complete the formation of a closed tank, the cured, ribbed cylindrical wall issuing from the mandrel 20 is cut to the desired length, and a pre-fabricated end cap, preferably of generally convex configuration, is secured to each open extremity of the cylindrical wall. Such end caps are secured by resin impregnated mat layers overlapping the peripheral edge of each cap and the open end of the cylindrical wall, the resin being subsequently air-cured or thermally cured, as desired. The prefabrication of the end caps by a suitable method is disclosed in Bastone, et al. U.S. Pat. No. 3,412,891, and the application and securing of such end caps is well known in the art.

Alternatively, the cylindrical wall may be utilized as a conduit or pipe section without the application of end caps. If desired, a particulate filler, such as sand, silica flour or the like, may be incorporated into the wall 30 to increase the wall thickness and the structural strength of the wall, as is well known in the art.

Since the present invention is concerned with the provision of the rib structure of FIG. 9 and the method and apparatus for making such ribs, the end use of the ribbed structure as a tank component or as a conduit is immaterial, as is the specific structure of the wall 30 upon which the rib structure of FIG. 9 is superimposed.

The final rib 90 of FIG. 9, in essence, comprises the internal rib form 56 completely encased within a plurality of layers of mat 65 secured to the wall by zero degree filament windings 81, 82, located respectively at the crown of the rib and at the rib-wall juncture, the filament windings 81, 82 being inter-leafed between the successive layers of mat, and the entire rib being integrated into the final structure by a resin matrix which is commonly cured. The resultant rib 90 combines very desirable physical properties of high bending moments, great stiffness and maximum deflection tolerance, while deriving maximum benefit from the glass fiber content by virtue of the zero degree windings in the hoop direction specifically located at the crown and the feet of the rib structure, and also by virtue of the woven mat having directional woven roving filament orientation with the randomly oriented glass fiber content at the interior of each mat layer insuring resin impregnation. These structural characteristics are obtained while, at the same time, the fabrication technique insures the rapid build-up of the rib structure on the continuously helically travelling wall 30.

I claim:

1. In a method of making an exterior peripheral support rib for a cylindrical wall structure having a longitudinal axis, the steps of
    1. rotating said wall structure about its longitudinal axis,
    2. winding peripherally upon said wall structure a plurality of groups of endless, resin-impregnated reinforcing filaments traversing movable guide elements located at a non-rotatable work station, said groups of filaments being axially spaced from one another along said longitudinal axis, and said filaments being tensioned axially to lie generally tangentially to said wall at the point of filament-wall contact, 3. feeding a pre-fabricated, resin-impregnated elongated rib assembly from said work station into the nip between said tangential filaments and said wall, said filaments under tension pulling said prefabricated rib assembly radially onto said wall structure,
4. continuing to feed said pre-fabricated rib assembly into nip until said wall structure is completely encircled by said prefabricated rib assembly, and
5. continuing the peripheral winding of said filaments upon said pre-fabricated rib assembly to build up a plurality of layers of filaments wound radially thereon at axially spaced portions of said prefabricated rib,
6. moving said guide elements relative to said rib assembly during the performance of step 5 to vary the axial spacing of said groups of filaments and
7. concurrently curing the resin of said pre-fabricated rib and of said filament windings.

2. In a method of fabricating a peripheral support rib for a cylindrical wall of partially cured resin and reinforcing fibers admixed with said resin, said wall having a longitudinal axis, the steps of
1. rotating the cylindrical wall about its axis and past a non-rotatable work station,
2. affixing to said wall the free ends of a plurality of bundles of resin-impregnated, elongated reinforcing filaments, said plurality of bundles being spaced from one another along the axis of said wall.
3. peripherally winding said bundles of filaments about said wall in an essentially radial plane, said filaments being tensioned to project tangentially of said wall in proximity to said station, thereby defining a nip located at the wall adjacent said station,
4. at said station, feeding (a) a generally convex rib form and (b) a resin-impregnated reinforcing fiber mat superimposed on said rib form into said nip while continuing the winding of said filaments, said filaments under tension radially forcing said rib form and said mat into arcuate peripheral contact with said wall,
5. terminating the feeding of said rib form when said rib form completely encircles said wall, while continuing the feeding of said mat and the winding of said filaments,
6. terminating the feeding of said mat after a plurality of layers of mat have been superimposed on said rib form,
7. continuing the winding of said filaments after termination of the feeding of said mat to build up additional layers of filament windings on the uppermost layer of mat,
8. varying the spacing of said bundles of filaments from one another axially of said wall during the performance of steps 4, 5 and 7 to selectively place the successive layers of filament windings on the resultant rib structure,
9. terminating the winding of said filaments, and
10. effecting a common final curing of the resin of said wall and of said rib to yield an integral monolithic structure.

3. In a method of making a peripheral support rib for an endless cylindrical wall the steps of
1. rotating the wall relative to a non-rotatable work station while concurrently axially advancing the wall and the work station in synchronism,
2. peripherally winding upon said wall a plurality of groups of endless resin-impregnated reinforcing filaments traversing filament guides movable relative to one another and to the work station,
3. tensioning said filaments as they are wound so that the filaments lie tangentially to the wall at their points of contact with the wall,
4. interposing a pre-fabricated, resin-impregnated rib assembly between said filaments and said wall at their common points of tangency while advancing the rib assembly with said work station,
5. utilizing the tension of said filaments to force said pre-fabricated rib assembly snugly against said wall to peripherally encircle said wall,
6. moving said filament guides relative to one another and relative to said work station while superimposing additional wound filaments on said rib assembly to reinforce different portions of the rib assembly and to bind the different portions of the rib to said wall,
7. and finally concurrently curing the resin of said rib assembly and of said filaments.

4. In a method of making an exterior support rib for a cylindrical wall structure having a longitudinal axis, said rib including a rib form encircling the wall structure, the improvement of filament winding a plurality of axially spaced bundles of filament rovings onto said rib form, each such bundle traversing a filament guide initially aligned with a specific portion of said rib form, and progressively displacing some of said filament guides relative to others of said guides during the filament winding to corresponding progressively superimpose the respective bundles traversing the displaced guides on different portions of said rib form.

5. In a method of making an exterior support rib for a cylindrical wall having a longitudinal axis, the wall being rotated and axially advanced as the method is carried out, and the rib being built up on a rib form encircling the wall, the steps of advancing a pivotable plate in synchronism with the axial advance of the wall carrying the rib form, tensioning a plurality of bundles of reinforcing filaments from a source of such filaments past guides on said plate and onto said rib form, and pivoting said plate as a consequence of advancement of said plate to vary the positions of said guides and the placement of said filaments on said rib form.

6. In a method of making an exterior support rib for a cylindrical wall having a longitudinal axis, the wall being rotated and axially advanced as the method is carried out, and the rib being built up on a rib form encircling the wall, the steps of advancing a plurality of axially spaced filament guides in synchronism with the axial advance of the wall carrying the rib form, applying a plurality of bundles of reinforcing filaments onto said rib form, said bundles each contacting one of said filament guides to position each bundle on the rib form, and varying the positions of said guides relative to one another as said guides are advanced to vary the placement of said filaments on said rib form.

7. In an apparatus for applying an encircling rib to a cylindrical wall for a tank or the like, said wall being supported for rotation about its longitudinal axis and being advanced axially along said longitudinal axis, the improvements of an endless chain located at said work station and having a horizontal reach parallel to the longitudinal axis of said wall, means for driving said chain so that said reach advances at the speed of axial advancement of said wall, a supply tray supported on said chain for displacement therewith, a pivotal horizontal plate journalled by said tray and having a plurality of vertically extending filament guide means movable with said plate, said filaments being tensioned from a source into contact with said guide means and then to said wall to tangentially contact said wall at a location radially aligned with said guide means, means on said tray movable therewith for feeding a prefabricated rib assembly between said filaments and said wall at the point of tangential contact therebetween, the tension of said filaments pulling said rib assembly into contact with the exterior of said wall, fixed cam means adjacent said chain, and cam follower means on said pivotal plate engageable with said cam means as said tray advances with the chain to pivot said plate and vary the location of said filament guide means relative to said rib assembly.

8. In an appratus for applying an encircling rib to a cylindrical wall for a tank or the like, said wall being supported for rotation about its longitudinal axis,
1. a non-rotatable work station radially aligned with the location of said rib,
2. means for radially filament winding on said wall a plurality of bundles of endless filaments impregnated with curable resin,
3. means for tensioning said filaments to tangentially contact said wall at the location of said work station,
4. means located at said work station for feeding a pre-fabricated rib assembly between said filaments and said wall at the point of tangential contact therebetween, the tension of said filaments pulling said rib assembly into contact with the exterior of said wall, and
5. means for progressively axially spreading said bundles of filaments to overlie selected portions of said rib assembly, including a fixed guide located at the work station for guiding a first medial bundle of filaments onto the prefabricated rib, a plurality of movable guide elements at said work station for guiding additional bundles of filaments onto said prefabricated rib, and means for displacing said movable guide elements relative to said fixed guide element.

9. In an apparatus for applying an encircling rib to a cylindrical wall for a tank or the like, said wall being supported for rotation about its longitudinal axis and being advanced axially along said longitudinal axis, the improvements of means defining a non-rotatable work station radially aligned with the location of the rib including an endless chain located at said work station and having a horizontal reach parallel to the longitudinal axis of said wall, means for driving said chain so that it advances at the speed of axial advancement of said wall, means for radially filament winding on said wall a plurality of bundles of endless filaments impregnated with curable resin and including filament guide means movable with said chain means for tensioning said filaments into tangential contact said wall at a location radially aligned with said guide means, and means carried by said chain and movable therewith for feeding a prefabricated rib assembly between said filaments and said wall at the point of tangential contact therebetween, the tension of said filaments pulling said rib assembly into contact with the exterior of said wall, said filament guide means including a pivot plate, filament-contacting guides carried by said plate, and means for pivoting said plate relative to said chain to vary the spacing of said guides.

10. In an apparatus for applying an encircling rib to a cylindrical wall for a tank or the like, said wall being supported for rotation about its longitudinal axis and being advanced axially along said longitudinal axis, the improvements of means defining a non-rotatable work station radially aligned with the location of the rib including an endless chain located at said work station and having a horizontal reach parallel to the longitudinal axis of said wall, means for driving said chain so that it advances at the speed of axial advancement of said wall, means for radially filament winding on said wall a plurality of bundles of endless filaments impregnated with curable resin and including a tray carried by said chain, a pivot plate movable relative to said tray, filament guide means mounted on said plate, and cam and follower means for pivoting said plate, means for tensioning said filaments into tangential contact said wall at a location radially aligned with said guide means, and means on said tray and movable therewith for feeding a prefabricated rib assembly between said filaments and said wall at the point of tangential contact therebetween, the tension of said filaments pulling said rib assembly into contact with the exterior of said wall.

* * * * *